United States Patent
Celinske et al.

(10) Patent No.: US 10,981,526 B2
(45) Date of Patent: Apr. 20, 2021

(54) SPLIT VEHICLE POWER BUSSES

(71) Applicant: Ford Global Technologies, LLC, Dearborn, MI (US)

(72) Inventors: David Celinske, Wolverine Lake, MI (US); Mathew Alan Boesch, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 16/023,426

(22) Filed: Jun. 29, 2018

(65) Prior Publication Data
US 2020/0001806 A1    Jan. 2, 2020

(51) Int. Cl.
| | | |
|---|---|---|
| *B60R 16/033* | (2006.01) | |
| *B60R 16/04* | (2006.01) | |
| *B60R 16/023* | (2006.01) | |
| *B60L 3/12* | (2006.01) | |
| *B60L 3/00* | (2019.01) | |
| *B62D 6/00* | (2006.01) | |
| *B60L 50/60* | (2019.01) | |

(52) U.S. Cl.
CPC .......... *B60R 16/033* (2013.01); *B60L 3/0046* (2013.01); *B60L 3/0076* (2013.01); *B60L 3/0092* (2013.01); *B60L 3/12* (2013.01); *B60L 50/66* (2019.02); *B60R 16/0232* (2013.01); *B60R 16/04* (2013.01); *B62D 6/008* (2013.01); *B60L 2210/10* (2013.01); *B60L 2260/26* (2013.01)

(58) Field of Classification Search
CPC ... B60R 16/033; B60R 16/04; B60L 2210/10; B60L 50/66; B60L 3/0092; B60L 2260/26; B60L 3/0046; B62D 6/008
See application file for complete search history.

(56) References Cited

U.S. PATENT DOCUMENTS

| | | | |
|---|---|---|---|
| 7,615,888 B2 | 11/2009 | Lathrop et al. | |
| 7,701,079 B2 | 4/2010 | O'Gorman et al. | |
| 7,761,198 B2 | 7/2010 | Bhardwaj | |
| 9,440,600 B2 | 9/2016 | Koch et al. | |
| 2002/0109406 A1* | 8/2002 | Aberle | B60L 58/30 307/10.1 |
| 2017/0349048 A1* | 12/2017 | Nakayama | B60L 1/003 |
| 2018/0029474 A1 | 2/2018 | Berels et al. | |
| 2019/0322245 A1* | 10/2019 | Kline | B60S 1/56 |
| 2019/0375298 A1* | 12/2019 | Symanow | B60L 53/24 |
| 2019/0389405 A1* | 12/2019 | Neuberger | B60R 16/03 |

FOREIGN PATENT DOCUMENTS

WO    2016025566 A2    2/2016

* cited by examiner

*Primary Examiner* — Jared Fureman
*Assistant Examiner* — Duc M Pham
(74) *Attorney, Agent, or Firm* — Frank A. MacKenzie; Bejin Bieneman PLC

(57) ABSTRACT

A system includes a first DCDC converter arranged to output electrical power only to a first battery and to first loads in a first specified set. The first specified set includes loads provided to control and perform steering and braking. The system further includes a second DCDC converter arranged to output electrical power to loads isolated from the first loads provided to control and perform steering and braking.

20 Claims, 9 Drawing Sheets

SPLIT VEHICLE POWER BUSSES

BACKGROUND

A vehicle may include electrically powered systems to perform braking, steering and virtual driving operations for which there is no mechanical back-up system. Fault conditions in electrically powered support systems, not provided to perform braking, steering or virtual driving, may reduce or eliminate the power available to perform the braking, steering and virtual driving operations. Vehicle support systems such as climate control systems, media control systems, body control systems, seating control systems, user interface systems, etc., that do not provide steering, braking, or virtual driving functionality, can develop fault conditions that result in excess power consumption. This excess power consumption can cause the power busses, from which they receive power, to be overloaded. When other systems that provide steering, braking or virtual driving functionality are powered from these overloaded power busses, the vehicle may lose the use of one or more of these systems. Without the use of these systems, the vehicle may lose the capability to continue driving or to drive to a safe location and stop.

DETAILED DESCRIPTION

Figure 1:
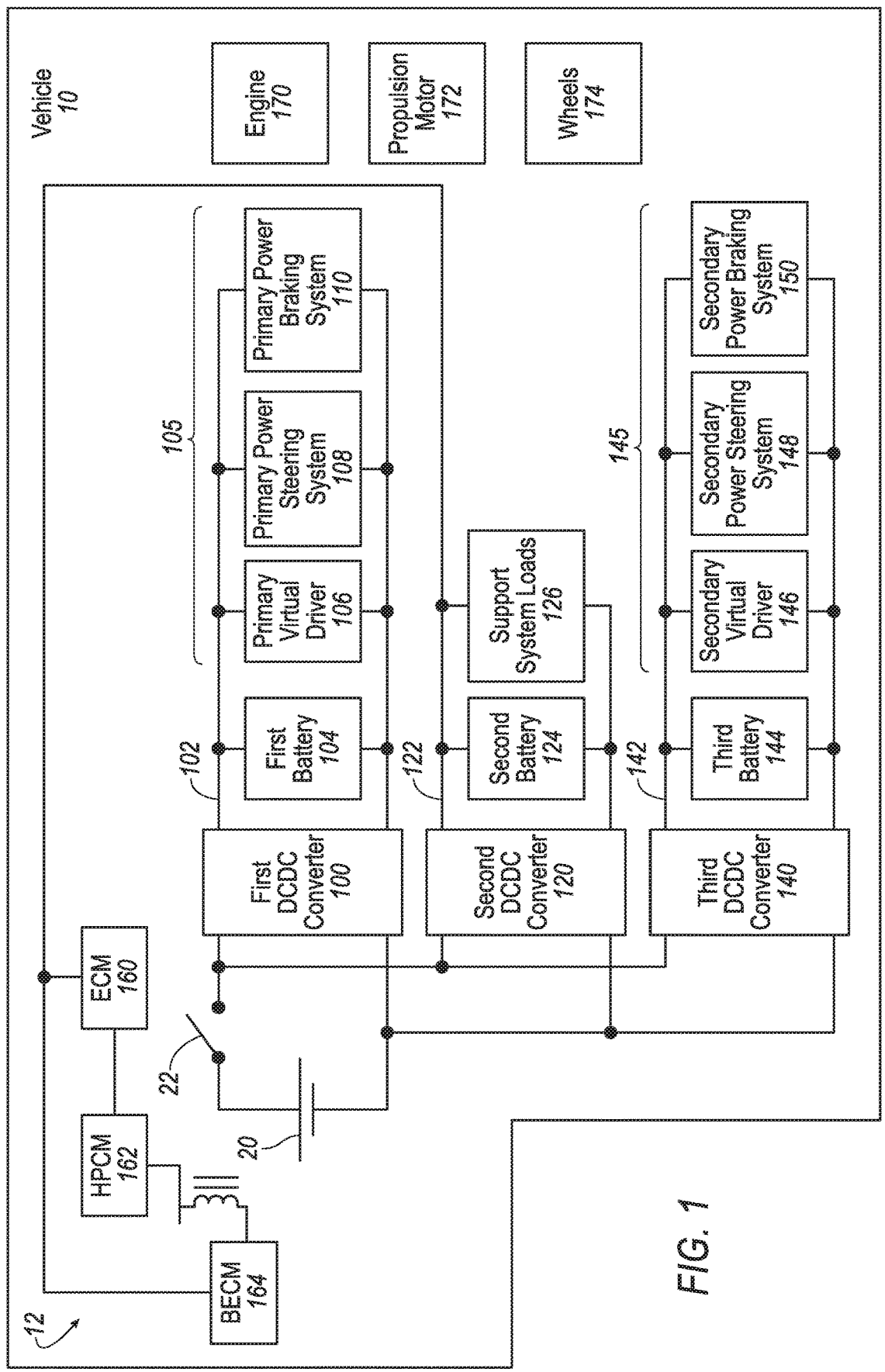
FIG. 1 is a block diagram of an example vehicle including a power system including three power busses.

A system includes a first DCDC converter arranged to output electrical power only to a first battery and to loads in a first specified set. The first specified set includes first loads provided to control and perform steering and braking. The system includes a second DCDC converter arranged to output electrical power to loads isolated from the first loads provided to control and perform steering and braking.

The system can include a third DCDC converter arranged to output electrical power only to a third battery and to loads in a second specified set. The second specified set can include second loads provided to control and perform steering and braking. The loads isolated from the first loads provided to control and perform steering and braking can further be isolated from the second loads provided to control and perform steering and braking.

The system can further include a high-voltage power supply arranged to provide power to the first, second and third DCDC converters.

The first specified set can include a primary virtual driver including a first computer and sensors collecting first received sensor data. The first specified set can further include a primary power steering system and a primary power braking system.

The second specified set can include a secondary virtual driver including a second computer and second sensors collecting second received sensor data. The second specified set can further include a secondary power steering system and a secondary power braking system.

The first computer can control steering and braking based on the first received sensor data, and the second computer can control steering and braking based on second received sensor data.

The first specified set can further include first loads provided to control and perform sensor cleaning.

The system can further include a third DCDC converter arranged to output electrical power only to a third battery and to loads in a second specified set, wherein the second specified set includes second loads provided to control and perform steering, braking, and sensor cleaning.

The second DCDC converter is can further be arranged to output electrical power to a battery electronic control module.

The second DCDC converter can further be arranged to output electrical power to at least one of an engine control module and a hybrid powertrain control module.

The system can further include a second battery, wherein the second DCDC converter supplies electrical power to the second battery.

The system can further include a first power bus, wherein the first DCDC converter outputs the electrical power to the first battery and to the first loads in the first specified set via the first power bus. The first battery can output electrical power to the first loads in the first specified set via the first power bus when a first amount of the electrical power output by the first DCDC converter to the first loads in the first specified set is less than a second amount of electrical power consumed by the first loads in the first specified set.

The system can include a second battery; and a second power bus. The second DCDC converter can output the electrical power via the second power bus to the second battery and the loads isolated from the first loads provided to control and perform steering and braking. The second battery can output electrical power to the loads on the second power bus when a first amount of electrical power output by the second DCDC converter is less than a second amount of electrical power consumed by the loads on the second power bus.

A system includes a first DCDC converter arranged to output electrical power only to a first battery, a battery electronic control module, an engine control module, a hybrid powertrain control module and to loads in a first specified set. The first specified set includes loads provided to perform steering and braking and a computer controlling the steering, and braking based on first received sensor data. The system further includes a second DCDC converter arranged to output electrical power to loads isolated from the computer, the steering, and the braking. The system further includes a third DCDC converter arranged to output electrical power only to a third battery and to loads in a second specified set, wherein the second specified set includes loads provided to perform steering and braking and a second computer controlling the steering, and braking based on second received sensor data.

The first specified set can include a primary virtual driver including the computer and sensors collecting the first received sensor data, a primary power steering system and a primary power braking system. The second specified set can include a secondary virtual driver including the second computer and sensors collecting the second received sensor data, a secondary power steering system and a secondary power braking system.

The first specified set can include a primary virtual driver including the computer and sensors collecting the first received sensor data. The first specified set can further include a primary power steering system, a primary power braking system and a primary sensor cleaning system.

The second specified set can include a secondary virtual driver including the second computer and sensors collecting the second received sensor data. The second specified set can further include a secondary power steering system, a secondary power braking system and a secondary sensor cleaning system.

A system includes a first DCDC converter arranged to output electrical power only to a first battery and to loads in a first specified set. The first specified set includes loads provided to perform steering and braking and a computer controlling the steering, and braking based on first received sensor data. The system further includes a second DCDC converter arranged to output electrical power to loads isolated from the computer, the steering, and the braking. The system further includes a third DCDC converter arranged to output electrical power only to a third battery, a battery electronic control module, an engine control module, a hybrid powertrain control module and to loads in a second specified set, wherein the second specified set includes loads provided to perform steering and braking and a second computer controlling the steering, and braking based on second received sensor data.

The first specified set can include a first virtual driver including the computer and sensors collecting the first received sensor data, a first steering system and a first braking system.

The second specified set can include a second virtual driver including the second computer and sensors collecting the second received sensor data, a second steering system and a second braking system.

The first specified set can include a primary virtual driver including the computer and sensors collecting the first received sensor data. The first specified set can further include a primary power steering system, a primary power braking system and a primary sensor cleaning system.

The second specified set can include a secondary virtual driver including the second computer and sensors collecting the second received sensor data. The second specified set can further include a secondary power steering system, a secondary power braking system and a secondary sensor cleaning system.

Continuous power is required for steering, braking and virtual driving functions in vehicles that do not have mechanical back-up systems for these functions. Virtual driving as used herein means that a computer performs operations to navigate or "drive" a vehicle, e.g., operations such as path finding, speed setting, collision avoidance, etc., executed to navigate a vehicle from a present location to a target location or to guide the vehicle to a safe stop. Advantageously, the likelihood of losing virtual driver capabilities can be reduced by isolating vehicle support systems such as climate control systems, media control systems, body control systems, seating control systems, user interface systems, etc., that do not provide steering, braking, or virtual driving functionality, on a separate power bus from systems that provide steering, braking or virtual driving functionality. In this case, a fault in one of the vehicle support systems may cause the power bus supplying power to the vehicle support system to be overloaded. Overloading the power bus, however, will not cause the loss of systems provided for steering, braking or virtual driving.

FIG. 1 is a block diagram of a vehicle 10 including a power system 12. The power system 12 includes a high-voltage power supply 20 and a high-voltage contactor 22. When the high-voltage contactor 22 is in a closed position, the high-voltage power supply 20 provide power to a first DCDC converter 100, a second DCDC converter 120 and a third DCDC converter 140. The vehicle 10 may include one or both of an engine 170 and a propulsion motor 172 to propel the vehicle 10 and further includes wheels 174.

The vehicle 10 may be capable of autonomous, semi-autonomous or manual modes of operation. An autonomous mode is defined as one in which the propulsion (typically via a powertrain including one or more electric motors and/or one or more internal combustion engines), braking, and steering are all controlled by one or more computers. A semi-autonomous mode is one in which at least one of vehicle propulsion (typically via a powertrain including an electric motor and/or internal combustion engine), braking and steering are control by one or more computers as opposed to a human operator. A manual mode is defined as one in which each of vehicle propulsion, braking and steering are controlled by a human operator.

The first DCDC converter 100 can receive electrical power at a specified high voltage, and output electrical power at a specified low voltage via a first power bus 102 to a first battery 104 and a first set of loads 105. The high voltage may be specified, for example, to be in a range of 16 volts to 600 volts. The low voltage may be specified, for example, to be in a range of 5 volts to 16 volts.

The first battery 104 may be, for example, a lithium-ion battery, or other rechargeable battery. The first battery 104 can be charged by the first DCDC converter 100. The first battery 104 can output electrical power to the first set of loads 105 when a first amount of electrical power output by the first DCDC converter 100 is less than a second amount of electrical power consumed by the loads in the first specified set 105.

In an example, the first set of loads 105 includes a primary virtual driver 106, a primary power steering system 108 and a primary power braking system 110. As described in additional detail below, the primary virtual driver 106 includes sensors for collecting data from the environment of the vehicle 10 and a computer including a process and memory, the processor programmed to control the steering and braking of the vehicle 10 based on data from the sensors. For example, the computer in the primary virtual driver 106 may generate instructions for the primary power steering system 108 and primary power braking system 110. Additionally, the primary virtual driver 106 may generate instructions to control the engine control module (ECM) 160 and/or hybrid powertrain control module (HPCM) 162.

The second DCDC converter 120 can receive electrical power at the specified high voltage and output electrical power via a second power bus 122 at the specified low voltage to a second battery 124, support system loads 126, the engine control module (ECM) 160, the hybrid powertrain control module (HPCM) 162, and the battery electronic control module (BECM) 164.

Support system loads 126 are electrical loads in the vehicle 10 for support systems, i.e., systems not required for operation of the primary virtual driver 106 or the secondary virtual driver 146 such as a climate control module, a seat control module, a media control module (internet, television, radio, etc.), a body control module, a user interface, etc., related, for example to user comfort, communication with the user and controlling the interior environment of the vehicle 10. The support system loads 126 do not include the ECM 160, HPCM 162 and BECM 164, and further do not include loads provided to steer or brake, or control the steering or braking of the vehicle 10.

The second battery 124 may be, for example, a lithium-ion battery, or other rechargeable battery. The second battery 124 can be charged by the second DCDC converter 120. The second battery 124 further can output electrical power to the loads on the second power bus 122 including the ECM 160, HPCM 162, BECM 164 and the support system loads 126 when a first amount of electrical power output by the second DCDC converter 120 is less than a second amount of electrical power consumed by the loads on the second power bus 122.

The third DCDC converter 140 can receive electrical power at the specified high voltage and output electrical power at the specified low voltage via a third power bus 142 to a third battery 144 and a second set of loads 145.

In an example, the second set of loads 145 includes a secondary virtual driver 146, a secondary power steering system 148 and a secondary power braking system 150. As described in additional detail below, the secondary virtual driver 146 includes second sensors for collecting second data from the environment of the vehicle 10 and a computer including a processor and memory, the processor programmed to control the steering and braking of the vehicle 10 based on second data from the second sensors. For example, the computer in the secondary virtual driver 146 may generate instructions for the secondary power steering system 148 and secondary power braking system 150.

The high-voltage power supply 20 can convert chemical or mechanical energy to electrical energy and may include a high voltage battery, generator or an alternator as is known. The high-voltage power supply 20 is further arranged to output power to the first, second and third DCDC converters 100, 120, 140 at the specified high voltage.

A high-voltage contactor 22 includes a switch between the high-voltage power supply 20 and the first, second and third DCDC converters 100, 120 and 140. When the high-voltage contactor 22 is in a closed position, the HV power supply 20 can supply electrical power to each of the first, second and third DCDC converters 100, 120 and 140. When the high-voltage contactor 22 is in an open position, the HV power supply 20 is isolated from the first, second and third DCDC converters 100, 120 and 140. In this case (i.e., the high-voltage contactor 22 in the open position), the first, second and third DCDC converters 100, 120, 140 do not receive power from the HV power supply 20 and cannot supply power to the first, second and third power busses 102, 122, 142. In this case, the first, second and third batteries 104, 124, 144 will output power respectively to the first, second and third busses 102, 122, 142 and their respective loads, for as long as the first, second and third batteries 104, 124, 144 respectively maintain a charge.

The engine 170 is a combustion engine as is known and can propel the vehicle 10. The primary virtual driver 106 may control the engine 170 via the engine control module (ECM) 160. When the primary virtual driver 106 is out-of-service, the secondary virtual driver 146 may also be programmed to control the engine 170 via the ECM 160.

The term "out-of-service" as used herein in reference to a system means that a computer has detected that the system is not performing according to specification. Such failure to perform according to specification may be identified by detecting a reported (e.g., via a CAN bus) fault condition in the system, a detected fault condition in the power supply to the system, a detected fault condition in a communication path between the system and another system, an intermittently detected fault condition, detected environmental conditions outside of specified operating conditions (e.g., over-temperature), etc.

A system may be out-of-service due to another system on a same power bus having a fault condition that draws too much power from the power bus. In such cases, the power bus may not be able to supply sufficient power to other systems on the power bus, or maintain the power bus at a voltage level specified to operate the other systems powered by the bus.

The engine control module (ECM) 160 is programmed to receive wheel torque and transmission range instructions and to control the engine 170 based on the instructions. In the absence of fault conditions, the ECM 160 may receive instructions from the primary virtual driver 160. In the case that the primary virtual driver 160 is out-of-service, the secondary virtual driver 146 may be programmed to control the engine 170 via the ECM 160.

Additionally or alternatively to the engine 170, the vehicle 10 may include a propulsion motor 172. The propulsion motor 172 is a high-voltage electric motor arranged to propel the vehicle 10. The primary virtual driver 106 may control the propulsion motor 172 via the hybrid powertrain control module (HPCM) 162. In the absence of fault conditions, the HPCM 162 may receive instructions from the primary virtual driver 106 and operate the propulsion motor 172 based on the instructions. Further, in the case of a fault condition with the primary virtual driver 106, the secondary virtual driver 146 may be programmed to send instructions to the HPCM 162 controlling the propulsion motor 172.

The vehicle 10 further includes a battery electronic control module (BECM) 164. The battery electronic control module 164 is programmed to monitor and control the high-voltage power supply 20 and protect the vehicle 10 against hazards due to high-voltage system failures.

The support system loads 126 are supplied from the second power bus 122. In the case that one of the support system loads 126 has a fault condition that overloads the second power bus 122, the second DCDC converter 120 may not be able to output sufficient power to the second power bus 122 causing one or more of the support system loads 126 to fail. Other electrically powered systems, such as the first set of loads 105 and second set of loads 145 used to autonomously control the vehicle 10, steer the vehicle 10 and brake the vehicle 10 are on separate isolated first and third power busses 102, 142, and can continue to operate. According to this organization of loads on the power system 12, fault conditions in support loads 126 can be prevented from causing loss of steering, braking, path finding, speed setting, collision avoidance, etc. related to driving the vehicle 10 or guiding the vehicle 10 to a safe stop.

Figure 2:
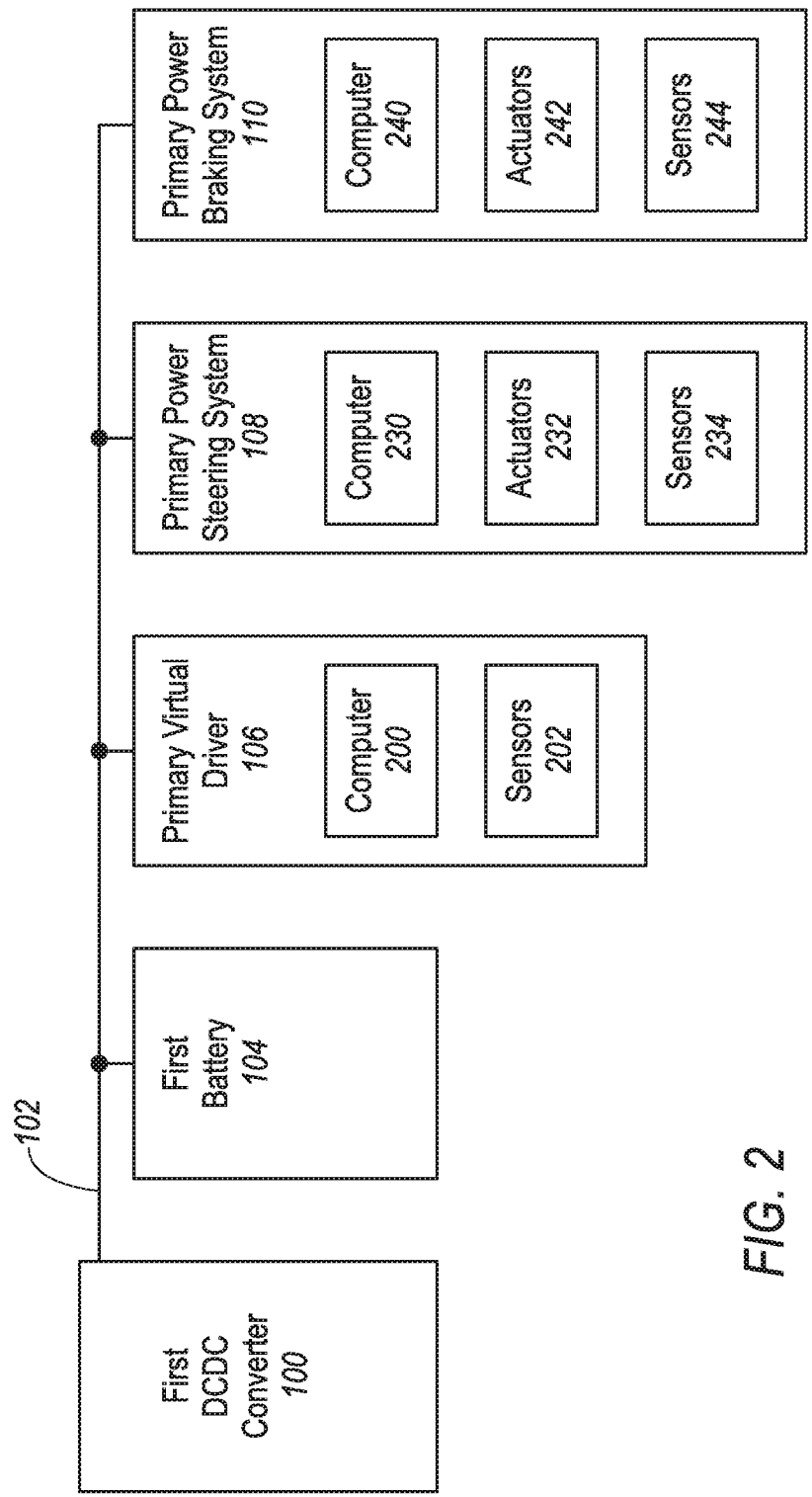
FIG. 2 is a block diagram showing a set of first loads coupled to a first power bus.

As described above, the first DCDC converter 100 can output low-voltage power, via the first power bus 102 to the first set of loads 105. Referring to FIG. 2, the first set of loads 105 includes the primary virtual driver 106, the primary power steering system 108 and the primary power braking system 110.

The primary virtual driver 106 includes a computer 200 and sensors 202 and operates the vehicle 10 autonomously. The computer 200 is programmed control and perform steering and braking. Controlling and performing steering and braking includes controlling the primary power steering system 108 provided for steering the vehicle 10 and the primary power braking system 110 provided for braking the vehicle 10. The computer 200 is further programmed to control the engine 170 via the engine control module 160 and the propulsion motor 172 via the hybrid powertrain control module 162. Still further, in the case that the primary power steering system 108 and/or primary power braking system 110 are out-of-service, the primary virtual driver 106 may be programmed respectively to control the secondary power steering system 148 and/or secondary power braking system 150.

The sensors 202 provide information to the computer 200 regarding the environment and the operating conditions of the vehicle 10. The sensors 202 may include radar, lidar, cameras, ultrasonic sensors, microphones, temperature sensors, light sensors, etc. that provide data regarding the environment around the vehicle 10. The sensors 202 may further include accelerometers, gyroscopes, temperature sensors, pressure sensors, etc. that provide information regarding the operating conditions of the vehicle 10 such as velocity, acceleration, lateral acceleration, wheel speed, engine speed, etc.

The primary power steering system 108 includes a computer 230, actuators 232 and sensors 234. The computer 230 is programmed to perform steering of the vehicle 10. That is, the computer 230 is programmed to receive instructions from and provide data to the primary virtual driver 106. Based on the instructions, the primary power steering system is programmed to control the actuators 232 to steer the vehicle 10. The actuators 232 include motors coupled to a steering rack to turn the wheels of the vehicle 10 from side-to-side. The primary power steering system 108 further includes sensors 234. The sensors 234 may include torque sensors, position sensors, current sensors, etc. that provide data related to the angle of the wheels with respect to the longitudinal axis of the vehicle 10 and torque experienced by the wheels to the computer 230. The computer 230 may provide the sensor data to the primary virtual driver 106 indicating, for example, the wheel angle and the torque experienced by the wheels.

The primary power braking system 110 includes a computer 240, actuators 242 and sensors 244. The computer 240 is programmed to perform braking of the vehicle 10. That is, the computer 240 is programmed to receive instructions from and provide data indicating a performance of the power braking system 110 to the primary virtual driver 106. Based on the instructions, the primary power braking system 110 controls the actuators 242 to brake the wheels of the vehicle 10. The actuators 242 may include motors, solenoids, pumps, etc., for generating brake pressure to apply to the wheels. The sensors 244 may include pressure sensors, current sensors, temperature sensors, etc. The sensors 244 collect data related to braking the vehicle 10 and provide the data to the computer 240. The computer 240 may provide the sensor data to the primary virtual driver 106, indicating, for example, an amount of brake pressure currently being applied to the wheels 174.

The second DCDC converter 120 can output low voltage power, via the second power bus 122, to the second battery 124, and the support system loads 126. In an example, the support system loads 126 include vehicle 10 electrical loads such as a climate control module, a seat control module, a media control module (internet, television, radio, etc.), a body control module, a user interface, etc., related, for example to user comfort, communication with the user and controlling the interior environment of the vehicle 10. The support system loads 126 are isolated from loads for steering, braking and virtual driving, related to driving the vehicle 10 or guiding the vehicle 10 to a safe stop. Further, the support loads do not include the ECM (160), the HPCM (162) and the BECM (164).

Figure 3:
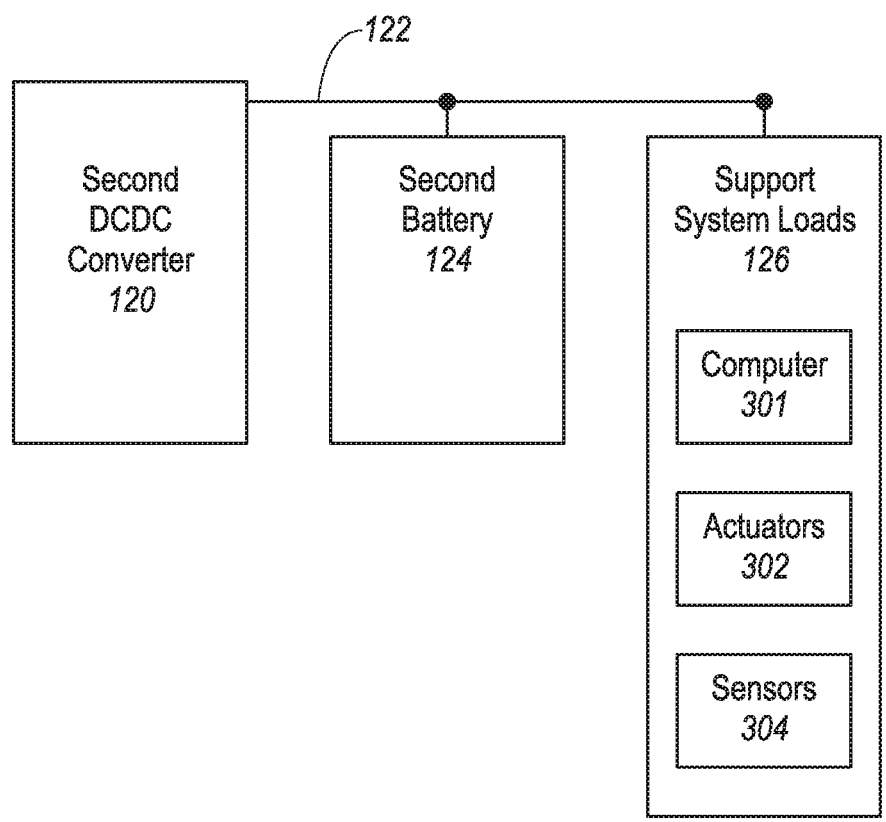
FIG. 3 is a block diagram showing support system loads coupled to a second power bus.

As shown in FIG. 3, each of the support system loads 126 may include a computer 301, actuators 302 and sensors 304. The computer 301 may programmed to exchange data and instructions with another vehicle computer, and execute instructions via the actuators 302. Further, the computer 301 in each support system load 126 may be coupled with sensors 304 in the support system load 126 and collect data from the sensors 304. Based on the collected data, the computer 301 may adjust controls of the actuators 302, and/or provide data to the other vehicle computer.

Figure 4:
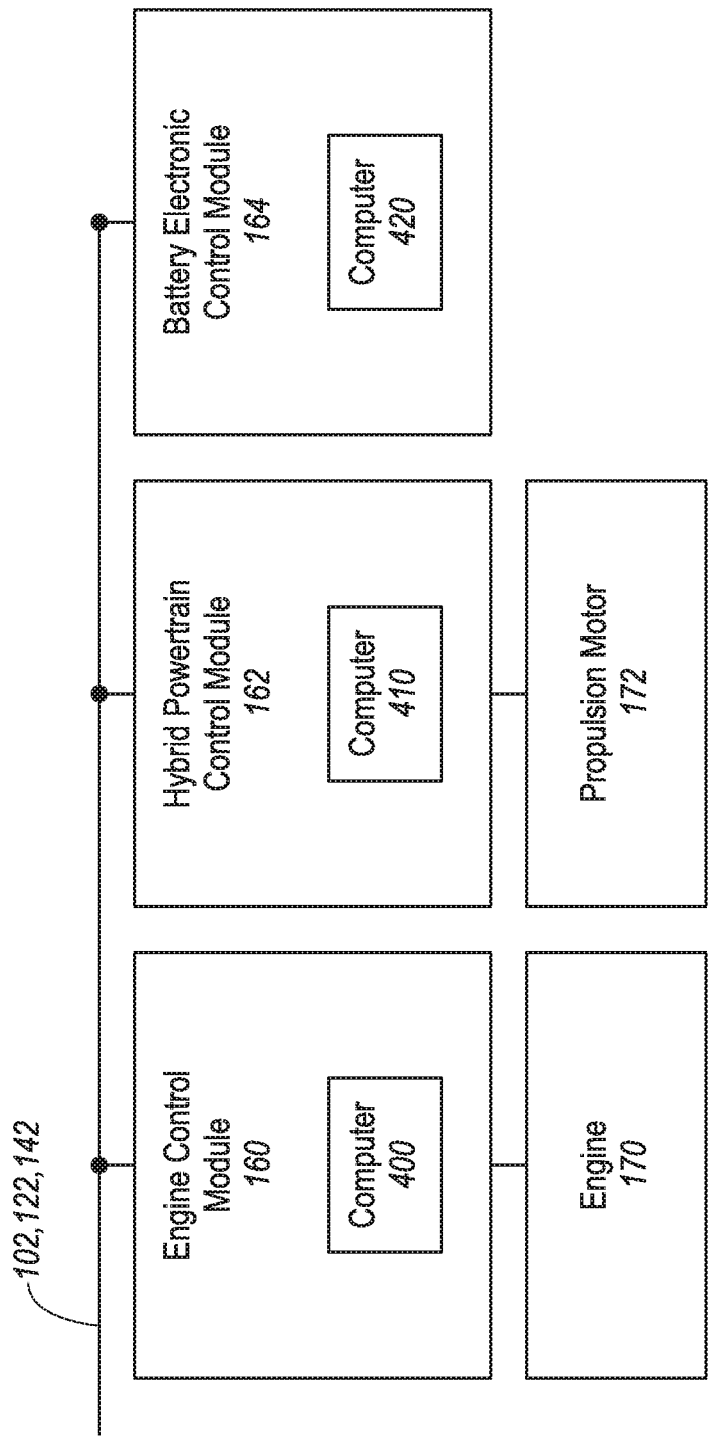
FIG. 4 is a block diagram showing an example engine control module, an example hybrid powertrain control module and an example battery electronic control module.

Referring to FIG. 4, the vehicle 10 includes a battery electronic control module (BECM) 164 and may further include one or both of an engine control module (ECM) 160 and a hybrid powertrain control module (HPCM) 162. In the vehicle 10, the ECM 160, HPCM 162 and BECM are coupled to and receive power from the second power bus 122. However, as indicated in FIG. 4, the ECM 160, HPCM 162 and BECM 164 may be powered by any one of the first power bus 102, second power bus 122 and third power bus 142.

Still referring to FIG. 4, the engine control module (ECM) 160 includes a computer 400 including a processor and memory programmed to control the engine 170 in the vehicle 10. The ECM 160 may receive instructions, for example from one of the primary virtual driver 106 and the secondary virtual driver 146, and control the engine 170 based on the instructions.

The hybrid powertrain control module (HPCM) 162 includes a computer 410 including a processor and memory programmed to control a propulsion motor 172 in the vehicle 10. The HPCM 162 may receive instructions, for example from one of the primary virtual driver 106 and the secondary virtual driver 146, and control the propulsion motor 172 based on the instructions.

The battery electronic control module 164 includes a computer 420 and memory programmed to monitor and control the high-voltage power supply 20 and protect the vehicle 10 against hazards due to high-voltage system failures.

Figure 5:
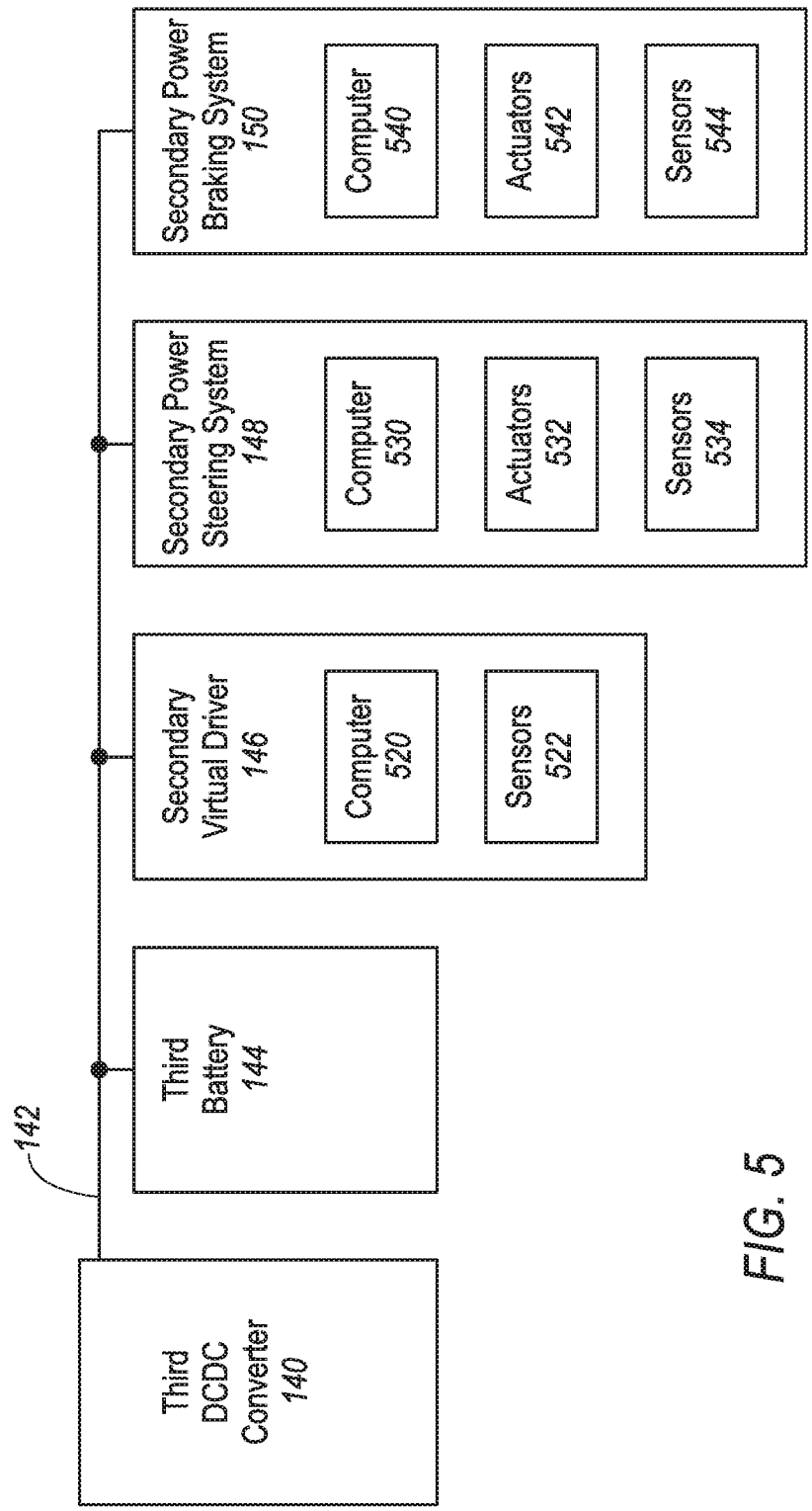
FIG. 5 is a block diagram showing a set of second loads coupled to a third power bus.

The third DCDC converter 140 is arranged can output low voltage power, via the third power bus 142, to the second set of loads 145. Referring to FIG. 5, the second set of loads 145 includes the secondary virtual driver 146, the secondary power steering system 148 and the secondary power braking system 150.

The secondary virtual driver 146 includes a computer 520 and sensors 522 and can operate the vehicle 10 autonomously. The secondary virtual driver 146 controls steering and braking. That is, the secondary virtual driver 146 is provided access and programmed to control the vehicle systems provided to operate the vehicle 10 autonomously when the primary virtual driver 106 is out-of-service. For example, a computer, such as the computer 520 included in the secondary virtual driver 146 may detect that the primary virtual driver 106 is out-of-service. Based on the detection, the computer may assign the secondary virtual driver 146 access to the primary power steering system 108 and the primary power braking system 110 to operate the vehicle 10.

The secondary virtual driver 146 may be programmed to perform a limited set of operations intended to bring the vehicle 10 into a safe condition. For example, the secondary virtual driver 146 may drive the vehicle 10 to the side of a road and stop the vehicle 10.

The computer 520 in the secondary virtual driver 146 is programmed to control the primary power steering system 108 provided for steering the vehicle 10 and the primary power braking system 110 provided for braking the vehicle 10. When the primary power steering system 108 and/or primary power braking system 110 are out-of-service, the computer 520 is further programmed to control the respective secondary power steering system 148 and/or secondary power braking system 150. The computer 520 may further be programmed to control the vehicle 10 engine 170 via the engine control module 160 and the propulsion motor 172 via the hybrid powertrain control module 162.

In some vehicles, the secondary virtual driver 146 only operates to coast the vehicle 10 to a safe place. That is, the secondary virtual driver 146 in some vehicles, is only programmed to control steering and braking, and not to control propulsion, of the vehicle 10.

The sensors 522 provide information to the computer 520 regarding the environment and the operating conditions of the vehicle 10. The sensors 522 include radar, lidar, cameras, ultrasonic sensors, microphones, temperature sensors, light sensors, etc. that provide data regarding the environment. The sensors 522 further include accelerometers, gyroscopes, temperature sensors, pressure sensors, etc., that provide information regarding the operating conditions of the vehicle 10 such as velocity, acceleration, lateral acceleration, wheel speed, engine speed, etc. The sensors 522 may be a limited set of sensors provided to perform the limited set of operations intended to bring the vehicle 10 into the safe condition.

The secondary power steering system 148 is programmed to perform steering of the vehicle 10. That is, the secondary power steering system 148 is programmed to receive instructions from the primary virtual driver 106 or secondary virtual driver 146 to control the steering of the vehicle 10 when the primary power steering system 108 is out-of-service.

The secondary power steering system 148 includes the computer 530, the actuators 532 and the sensors 534. In the case that the primary power steering system 108 is out-of-service, the computer 530 is programmed to receive instructions from and provide data to one of the primary virtual driver 106 or the secondary virtual driver 146. Based on the instructions, the primary power steering system 108 is programmed to control the actuators 532 to steer the vehicle 10. The actuators 532 include motors coupled to a steering rack to turn the wheels of the vehicle 10 from side to side. The primary power steering system 108 further includes sensors 534. The sensors 534 may include torque sensors, position sensors, current sensors, etc. that provide data providing the angle of the wheels with respect to a longitudinal axis of the vehicle 10, and torque experienced by the wheels, to the computer 530. Based on the data received from the sensors, the computer 530 may provide data to the primary virtual driver 106 or secondary virtual driver 146, indicating, for example, wheel angle and torque experienced by the wheels 174.

The secondary power braking system 150 is programmed to perform braking of the vehicle 10 in case the primary power braking system 110 is out-of-service. The secondary power braking system 150 includes a computer 540, actuators 542 and sensors 544. The computer 540 is programmed to receive instructions from and provide data to the primary virtual driver 106 or the secondary virtual driver 146. Based on the instructions, the secondary power braking system 150 is programmed to control the actuators 542 to brake the wheels 174 of the vehicle 10. The actuators 542 may include motors, solenoids, pumps, etc. for generating brake pressure to apply to the wheels 174. The sensors 544 may include pressure sensors, current sensors, temperature sensors, etc. The sensors 544 collect data related to braking the vehicle 10 and provide the data to the computer 540. The computer 540 may be programmed to provide data to the primary virtual driver 106 or the secondary virtual driver 146 based on the data received from the sensors 544.

Figure 6:
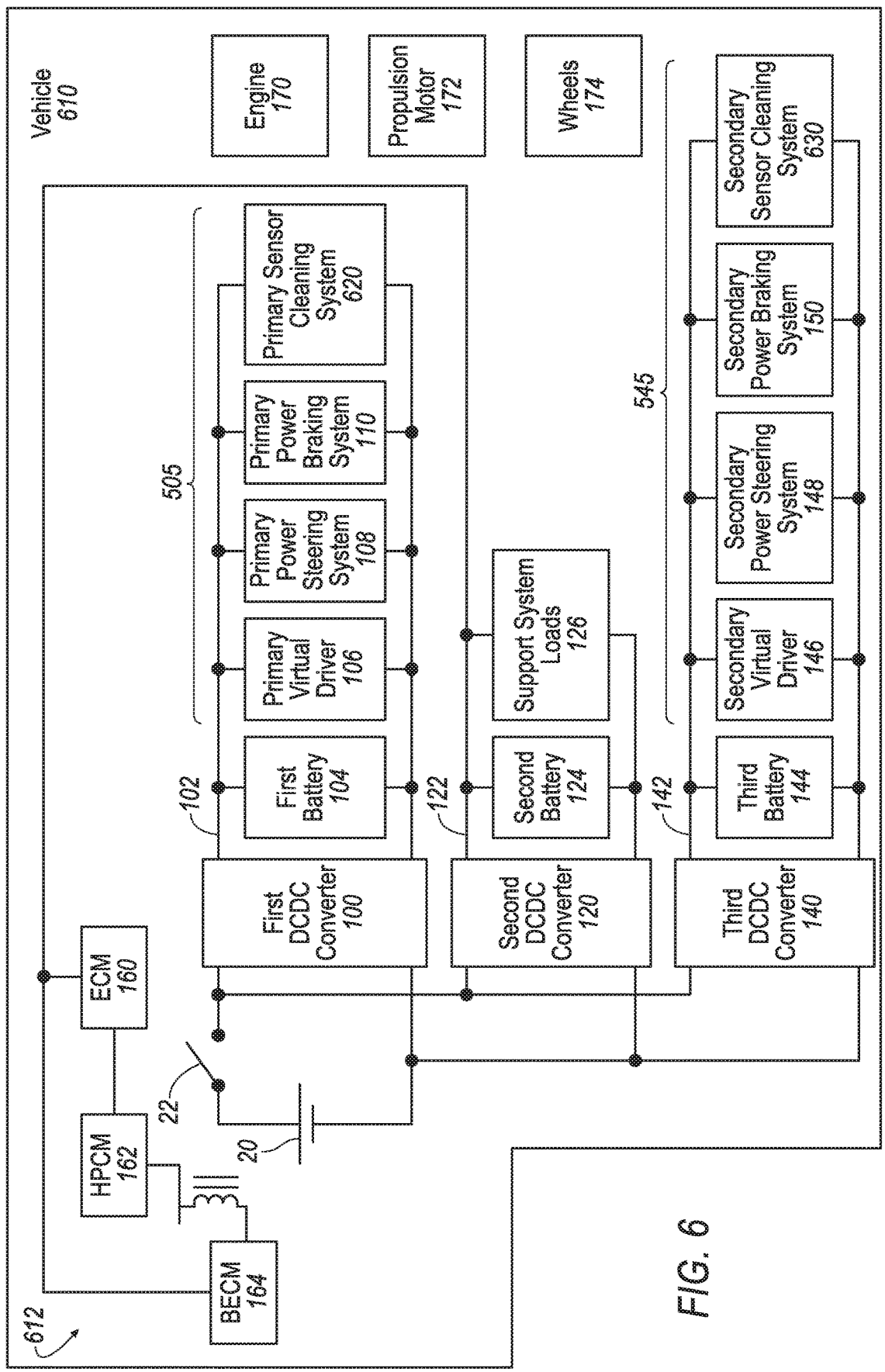
FIG. 6 is a block diagram of a vehicle including an example power system.

FIG. 6 illustrates an example vehicle 610 including an example power system 612. Components in the vehicle 610, having the same references numerals as in the vehicle 10 such as the engine 170, propulsion motor 172, wheels 174, first DCDC converter 100, etc. are the same as described above and will not be further described below.

In the power system 612, the first set of loads 505, supplied by the first power bus 102, includes the primary virtual driver 106, the primary power steering system 108, and the primary power braking system as in the power system 12. In addition, in the power system 612, the first set of loads 505 includes a primary sensor cleaning system 620.

Further, in the power system 612, the second set of loads 545, supplied by the third power bus 142, includes the secondary virtual driver 146, the secondary power steering system 148 and the secondary power braking system 150. Additionally, the second set of loads 545 includes the secondary sensor cleaning system 630.

Figures 7, 8:
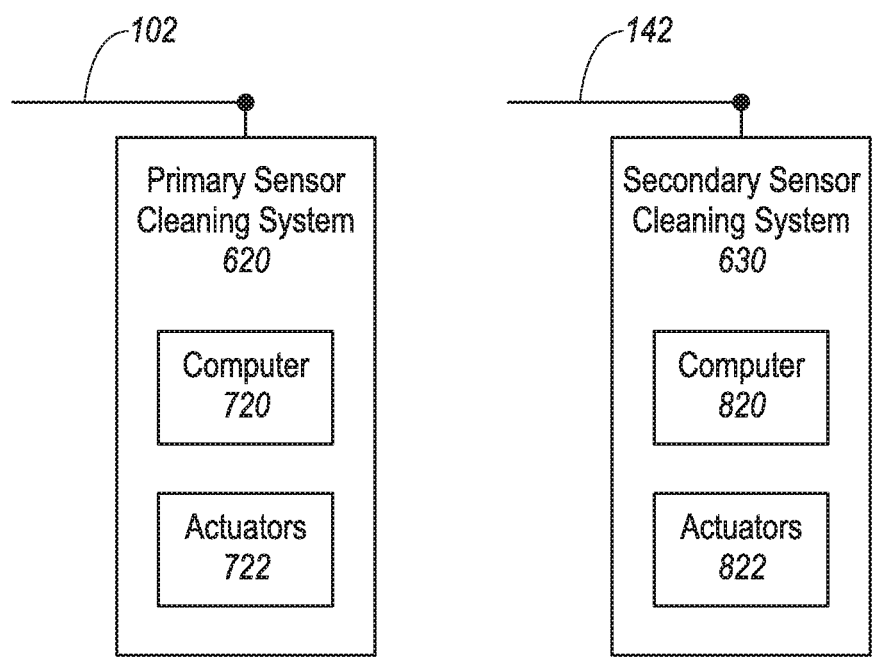
FIG. 7 is a block diagram of a primary sensor cleaning system coupled to a first power bus.
FIG. 8 is a block diagram of a secondary sensor cleaning system coupled to a third power bus.

The primary sensor cleaning system 620 is shown in FIG. 7. The primary sensor cleaning system 620 is programmed to receive instructions, for example, from the primary virtual driver 106, to clean sensors providing data for operating the vehicle 610 autonomously. For example, the primary sensor cleaning system 620 may be arranged to clean the sensors 202 in the primary virtual driver 106.

As shown in FIG. 7, the primary sensor cleaning system 620 can include a computer 720 and actuators 722. The computer 720 is programmed to received instructions, for example from the primary virtual driver 106, and control the actuators 722. The actuators 722 may be, for example, pumps to spray cleaning fluid on the sensors 202 or motors to drive wipers to clear optical surfaces of the sensors 202.

The secondary sensor cleaning system 630, shown in FIG. 8, includes a computer 820 and actuators 822. The secondary sensor cleaning system 630 can clean sensors providing data for operating the vehicle 610 autonomously. For example, when the secondary virtual driver 146 is activated, the secondary sensor cleaning system 630 may be arranged to clean sensors 402 associated with the secondary virtual driver 146.

Figure 9:
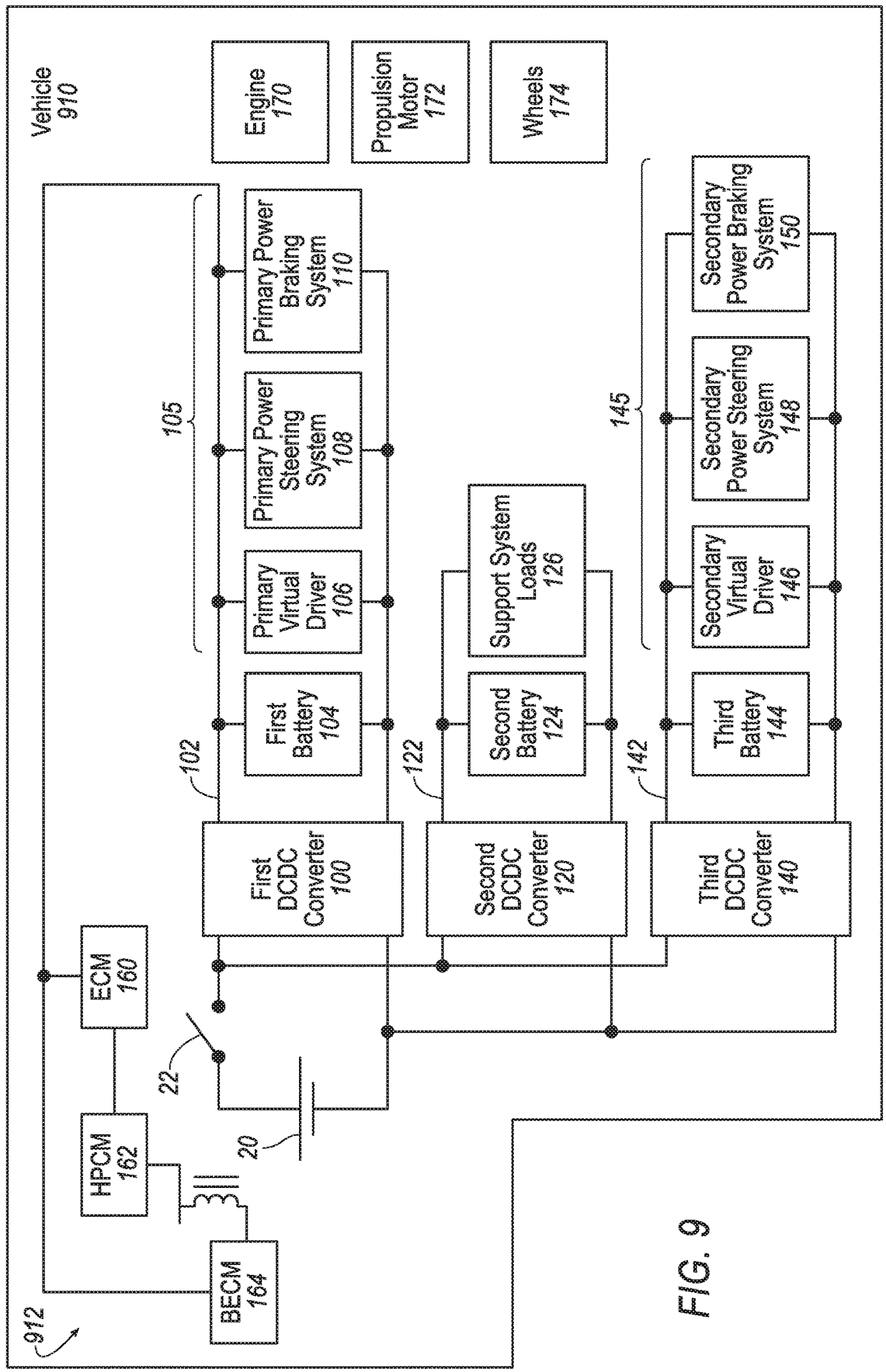
FIG. 9 is a block diagram of a vehicle including a second example power system.

FIG. 9 illustrates an example vehicle 910 including an example power system 912. Components in the vehicle 910, such as the engine 170, propulsion motor 172, wheels 174, first DCDC converter 100, etc. that have the same reference numerals as in the vehicle 10 are the same as described above and will not be further described below.

In the vehicle 910, the engine control module (ECM) 160, hybrid powertrain control module 162, and battery electronic control module 164 are powered by the first DCDC converter 100 via the first power bus 102. In this case, propulsion, via one or both of the ECM 160 and the HPCM 162 can continue when power is lost on the second power bus 122. Further, the battery electronic control module 164 can maintain the contact 22 in a closed position, allowing the first and third DCDC converters 100, 140 to continue operation.

Figure 10:
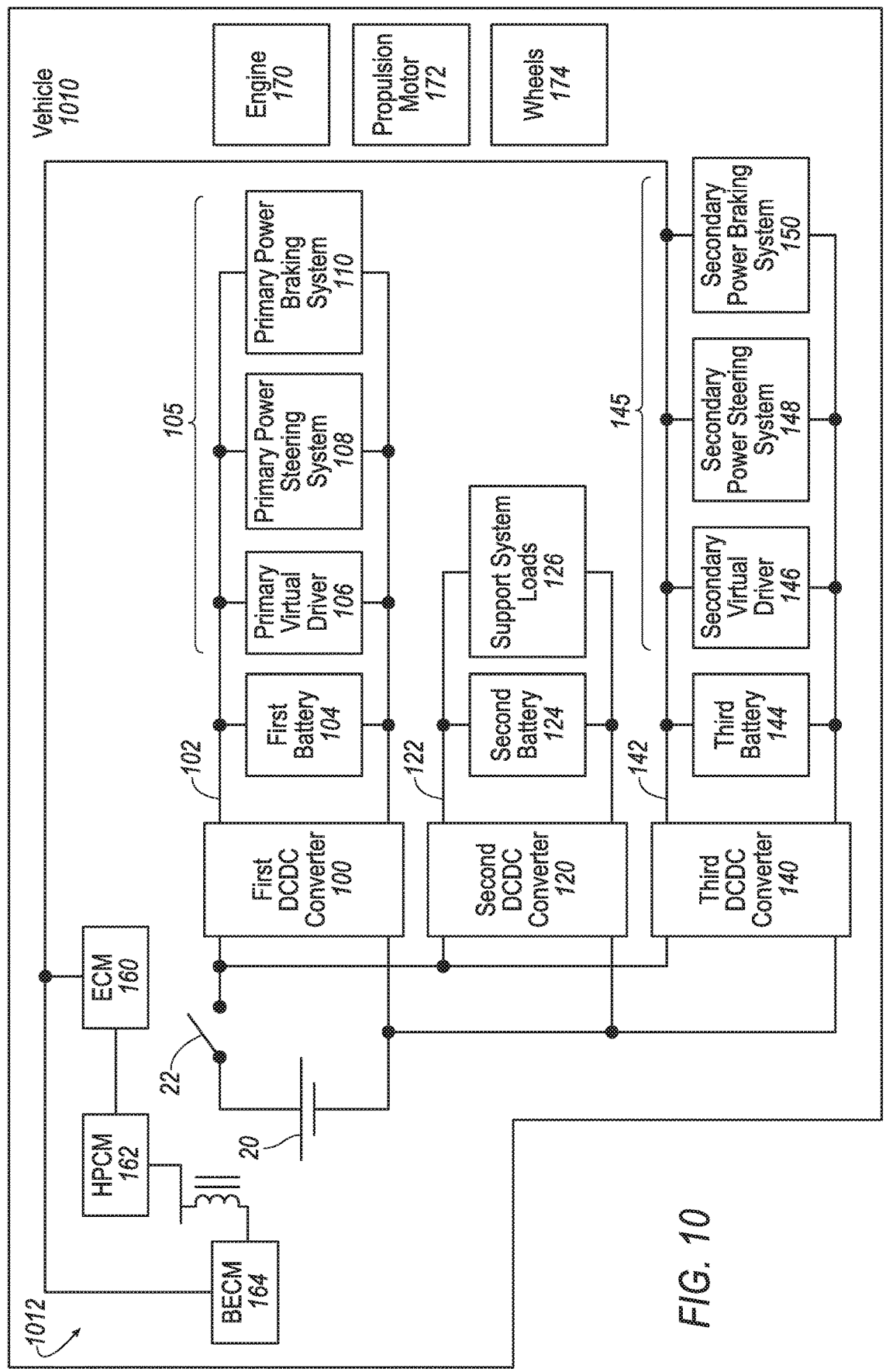
FIG. 10 is a block diagram of a vehicle including a third example power system.

FIG. 10 illustrates an example vehicle 1010 including an example power system 1012. Components in the vehicle 910, such as the engine 170, propulsion motor 172, wheels 174, first DCDC converter 100, etc. that have the same reference numerals as in the vehicle 10 are the same as described above and will not be further described below.

In the vehicle 1010, the engine control module (ECM) 160, hybrid powertrain control module 162, and battery electronic control module 164 are powered by the third DCDC converter 300 via the third power bus 142. Also in this case, propulsion, via one or both of the ECM 160 and the HPCM 162 can continue when power is lost on the second power bus 122. Also, in this case, the battery electronic control module 164 can maintain the contact 22 in a closed position, allowing the first and third DCDC converters 100, 140 to continue operation.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers, such as the computers 200, 230, 240, 301, 400, 410, 420, 520, 530, 540, 720, 820 and the plurality of other computers in the vehicles 10, 610, 910, 1010 generally include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in one of the computers is generally a collection of data stored on a computer readable medium, such as a storage medium, a random-access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system comprising:
   a first DCDC converter arranged to output electrical power only to a first battery and to loads in a first specified set, wherein the first specified set includes first loads provided to control and perform steering and braking; and
   a second DCDC converter arranged to output electrical power to loads isolated from the first loads provided to control and perform steering and braking;
   wherein the second DCDC converter is further arranged to output electrical power to at least one of an engine control module and a hybrid powertrain control module.

2. The system of claim 1, further comprising:
   a third DCDC converter arranged to output electrical power only to a third battery and to loads in a second specified set, wherein the second specified set includes second loads provided to control and perform steering and braking and the loads isolated from the first loads provided to control and perform steering and braking are further isolated from the second loads provided to control and perform steering and braking.

3. The system of claim 2, further comprising a high-voltage power supply arranged to provide power to the first, second and third DCDC converters.

4. The system of claim 2, wherein the first specified set includes a primary virtual driver including a first computer and sensors collecting first received sensor data, a primary power steering system and a primary power braking system, and the second specified set includes a secondary virtual driver including a second computer and second sensors collecting second received sensor data, a secondary power steering system and a secondary power braking system.

5. The system of claim 4, wherein the first computer controls steering and braking based on the first received sensor data, and the second computer controls steering and braking based on second received sensor data.

6. The system of claim 1, wherein the first specified set further includes first loads provided to control and perform sensor cleaning.

7. The system of claim 6, further comprising:
a third DCDC converter arranged to output electrical power only to a third battery and to loads in a second specified set, wherein the second specified set includes second loads provided to control and perform steering, braking, and sensor cleaning.

8. The system of claim 1, wherein the second DCDC converter is further arranged to output electrical power to a battery electronic control module.

9. The system of claim 1, further comprising:
a second battery, wherein the second DCDC converter supplies electrical power to the second battery.

10. The system of claim 1, further comprising a first power bus, wherein the first DCDC converter outputs the electrical power to the first battery and to the first loads in the first specified set via the first power bus.

11. The system of claim 10, wherein the first battery outputs electrical power to the first loads in the first specified set via the first power bus when a first amount of the electrical power output by the first DCDC converter to the first loads in the first specified set is less than a second amount of electrical power consumed by the first loads in the first specified set.

12. The system of claim 10, further comprising:
a second battery; and
a second power bus, wherein the second DCDC converter outputs the electrical power via the second power bus to the second battery and the loads isolated from the first loads provided to control and perform steering and braking.

13. The system of claim 12, wherein the second battery outputs electrical power to the loads on the second power bus when a first amount of electrical power output by the second DCDC converter is less than a second amount of electrical power consumed by the loads on the second power bus.

14. A system comprising:
a first DCDC converter arranged to output electrical power only to a first battery, a battery electronic control module, an engine control module, a hybrid powertrain control module and to loads in a first specified set, wherein the first specified set includes loads provided to perform steering and braking and a computer controlling the steering, and braking based on first received sensor data;
a second DCDC converter arranged to output electrical power to loads isolated from the computer, the steering, and the braking; and
a third DCDC converter arranged to output electrical power only to a third battery and to loads in a second specified set, wherein the second specified set includes loads provided to perform steering and braking and a second computer controlling the steering, and braking based on second received sensor data.

15. The system of claim 14, wherein the first specified set includes a primary virtual driver including the computer and sensors collecting the first received sensor data, a primary power steering system and a primary power braking system, and the second specified set includes a secondary virtual driver including the second computer and sensors collecting the second received sensor data, a secondary power steering system and a secondary power braking system.

16. The system of claim 14, wherein the first specified set includes a primary virtual driver including the computer and sensors collecting the first received sensor data, a primary power steering system, a primary power braking system and a primary sensor cleaning system, and the second specified set includes a secondary virtual driver including the second computer and sensors collecting the second received sensor data, a secondary power steering system, a secondary power braking system and a secondary sensor cleaning system.

17. A system comprising:
a first DCDC converter arranged to output electrical power only to a first battery and to loads in a first specified set, wherein the first specified set includes loads provided to perform steering and braking and a computer controlling the steering, and braking based on first received sensor data;
a second DCDC converter arranged to output electrical power to loads isolated from the computer, the steering, and the braking; and
a third DCDC converter arranged to output electrical power only to a third battery, a battery electronic control module, an engine control module, a hybrid powertrain control module and to loads in a second specified set, wherein the second specified set includes loads provided to perform steering and braking and a second computer controlling the steering, and braking based on second received sensor data.

18. The system of claim 17, wherein the first specified set includes a first virtual driver including the computer and sensors collecting the first received sensor data, a first steering system and a first braking system, and the second specified set includes a second virtual driver including the second computer and sensors collecting the second received sensor data, a second steering system and a second braking system.

19. The system of claim 17, wherein the first specified set includes a primary virtual driver including the computer and sensors collecting the first received sensor data, a primary power steering system, a primary power braking system and a primary sensor cleaning system, and the second specified set includes a secondary virtual driver including the second computer and sensors collecting the second received sensor data, a secondary power steering system, a secondary power braking system and a secondary sensor cleaning system.

20. A system comprising:
a first DCDC converter arranged to output electrical power only to a first battery and to loads in a first specified set, wherein the first specified set includes first loads provided to control and perform steering and braking;
a second DCDC converter arranged to output electrical power to loads isolated from the first loads provided to control and perform steering and braking; and
a third DCDC converter arranged to output electrical power only to a third battery and to loads in a second specified set, wherein the second specified set includes second loads provided to control and perform steering and braking and the loads isolated from the first loads provided to control and perform steering and braking are further isolated from the second loads provided to control and perform steering and braking;
wherein the first specified set includes a primary virtual driver including a first computer and sensors collecting first received sensor data, a primary power steering system and a primary power braking system; and
the second specified set includes a secondary virtual driver including a second computer and second sensors collecting second received sensor data, a secondary power steering system and a secondary power braking system.

* * * * *